Patented Nov. 19, 1946

2,411,177

UNITED STATES PATENT OFFICE 2,411,177

CHEMICAL COMPOUNDS

Oskar Wintersteiner, New Brunswick, and William L. Ruigh, Princeton, N. J., assignors to E. R. Squibb & Sons, New York, N. Y., a corporation of New York No Drawing. Application November 29, 1941, Serial No. 421,040

5 Claims. (Cl. 260—397.2)

This invention relates to, and has for its object the provision of: (I) 3-hydroxy-$\Delta^5$-7-acyloxy-cyclopentenoperhydrophenanthrenes, especially 7-acyloxy-sterols; and (II) an advantageous method of preparing 3-oxy-$\Delta^5$-7-dehydro-cyclopentenoperhydrophenanthrenes, especially 7-dehydrosterols, involving the intermediate formation of the 3-hydroxy-$\Delta^5$-7-acyloxy-cyclopentenoperhydrophenanthrenes.

For brevity and convenience, the term "cyclopentenoperhydrophenanthrene" is hereinafter replaced by the apt (telescopically-formed) term cythrene.

It has been found that the treatment of a 3,7-diacyloxy-$\Delta^5$-cythrene with a hydrolyzing agent under mild reaction conditions results in the selective and quantitative hydrolysis of the acyloxy group in the 3-position and formation of the corresponding 3-hydroxy-$\Delta^5$-7-acyloxy-cythrene. This result was contrary to expectation, because the usual method of hydrolyzing 3,7-diacyloxy-$\Delta^5$-cythrenes (boiling with a strong alkali, such as an alcoholic solution of potassium hydroxide) removed both acyl groups with the formation of the free diol, and because it was presumable that the ester group in the 7-position would be selectively affected in any partial hydrolysis (this position being adjacent to a double bond, and the ester group in this position being selectively affected when esters such as the dibenzoate of 7-hydroxycholesterol are subjected to thermal decomposition).

The method of preparing 3-oxy-$\Delta^5$-7-dehydrocythrenes in accordance with this invention comprises converting a 3,7-diacyloxy-$\Delta^5$-cythrene into the corresponding 3-hydroxy-$\Delta^5$-7-acyloxy-cythrene, and converting the latter into the corresponding 3-hydroxy-$\Delta^5$-7-dehydro-cythrene, preferably by subjecting the 3-hydroxy-$\Delta^5$-7-acyloxy-cythrene to thermal decomposition, either alone or in the presence of a high-boiling amine. This method possesses marked advantages over the prior methods involving conversion of the 3,7-di-acyloxy-$\Delta^5$-cythrene into the corresponding 3-acyloxy-$\Delta^5$-7-dehydro-cythrene by thermal decomposition, and conversion of the latter into the corresponding 3-hydroxy-$\Delta^5$-7-dehydro-cythrene by hydrolysis. These advantages include the following: the formation of by-products in the thermal decomposition (resulting, in the prior methods, from the partial removal of the acyloxy group in the 3-position) is avoided; purification of the final product is greatly facilitated, the 3-hydroxy-$\Delta^5$-7-dehydro-cythrene and unreacted 3-hydroxy-$\Delta^5$-7-acyloxy-cythrene being readily separable; the necessity of reacting (hydrolyzing) a 3-oxy-$\Delta^5$-7-dehydro-cythrene is avoided, thus minimizing the possibility of loss by decomposition or oxidation (the esters of 3-hydroxy-$\Delta^5$-7-dehydro-cythrenes intermediately formed in the prior methods being relatively unstable and oxidizable compounds, particularly when impure); and the thermal decomposition can be effected at a lower temperature than that required in the prior methods, thus minimizing the possibility of decomposition.

Preferably, the selective hydrolysis is effected by treating the 3,7-di-acyloxy-$\Delta^5$-cythrene with an alkaline hydrolyzing agent (especially sodium methylate), the reactants being in low concentration and/or the temperature being low (i. e., room or slightly elevated). The utilizable alkaline hydrolyzing agents include, inter alia, other alkali-metal alcoholates, alkali hydroxides and alkali carbonates, in suitable solvents.

The thermal decomposition of the 3-hydroxy-$\Delta^5$-7-acyloxy-cythrene may be effected by heating the compound to a temperature of the order of 165–185° C. under a vacuum of 2 mm. mercury or less, or by refluxing the compound with a high-boiling organic amine. The amines used in the thermal decomposition of the 3,7-di-acyloxy-$\Delta^5$-cythrenes (e. g., dimethyl-aniline, diethyl-aniline, and diethyl-amino-cyclohexylamine) are utilizable for the thermal decomposition of the 3-hydroxy-$\Delta^5$-7-acyloxy-cythrenes.

Purification of the final product, e. g., 7-dehydro-cholesterol, formed by the thermal decomposition may be effected as follows: (a) after thermally-decomposing 7-benzoxy-cholesterol, for example, by heating alone in a moderately high vacuum (during which the benzoic acid formed is simultaneously removed by distillation), the vacuum is increased to about $10^{-3}$ to $^{-4}$ mm. mercury and the 7-dehydrocholesterol sublimed; or (b) after thermally-decomposing the 7-benzoxy-cholesterol, either alone or in the presence of a high-boiling amine, the 7-dehydrocholesterol is isolated quantitatively and in essentially pure condition by precipitating it with digitonin in 90% alcohol, and dissociating the digitonide with pyridine (the unreacted 7-benzoxy-cholesterol being not precipitated by digitonin under these conditions). This digitonin-precipitation purification step cannot be used in the prior thermal-decomposition methods, since the 3-acyloxy-$\Delta^5$-7-dehydro-cythrenes formed therein are not precipitable with digitonin.

The 7-dehydrocholesterol obtained in accordance with this invention can be readily activated by ultraviolet light or other physico-chemical means to provide an antirachitic agent. The intermediates, 3-hydroxy-$\Delta^5$-7-acyloxy-cythrenes, are useful for the preparation of many products, inter alia, the antirachitic vitamins and other steroid derivatives having the general structure of a 7-dehydro-sterol with a conjugated system of double bonds in ring B, steroid derivatives having a double bond in positions 8,14 and 14,15 of the cythrene nucleus, and isodehydrosteroids (which, in turn, may serve as intermediates for hormone synthesis).

The 3,7-di-acyloxy-$\Delta^5$-cythrenes utilizable in the practice of this invention include, inter alia, the dibenzoate, diacetate, di-(substituted benzoic acid) esters, di-(phenyl-acetate), di-cinnamate, and other di-(lower fatty acid) esters of the 3,7-dihydroxy-$\Delta^5$-cythrenes, preferably of the 7-hydroxysterols (e. g., 7-hydroxycholesterol, 7-hydroxystigmasterol, and 7-hydroxysitosterol).

The following examples are illustrative of the invention:

Example 1

(a) 10 g. 7-hydroxycholesterol-dibenzoate is dissolved in 200 cc. benzene, a solution of 6.66 g. sodium methylate in 333 cc. methanol is added thereto, and the mixture is allowed to stand for two days at room temperature. The reaction mixture is then poured onto cracked ice, and the benzene solution is separated, washed in succession with dilute hydrochloric acid, water, and dilute sodium carbonate solution, and dried with sodium sulphate. On evaporating off most of the benzene and adding hexane, 7-benzoxy-cholesterol separates as a solid product; and on recrystallization from hexane, it forms filamentous needles melting at 110–120° C. (depending on the rate of heating). The compound has a rotation of $[\alpha]_D^{24} + 111°$ (in chloroform), and possesses the required composition $C_{34}H_{50}O_3$. The yield is practically quantitative; and chromatographic analysis over alumina shows the absence of a detectable amount of the isomeric monoester, 7-hydroxy-cholesterol benzoate (M. P. 184–191° C.).

(b) 300 mg. 7-benzoxy-cholesterol is heated in a tube evacuated to 2 mm. of mercury to a temperature of 175° C. for two hours, and the evolved benzoic acid condensed in a cooled trap. The vacuum is then increased to $10^{-4}$ mm. mercury, and the resulting distillate collected. The product, essentially 7-dehydro-cholesterol, is suitable for use in the production of vitamin $D_3$ by irradiation with ultra-violet light. The yield (based on spectrographic assay) is 53%, and the undistilled residue contains a further amount of 7-dehydrocholesterol.

The product may be further purified by dissolving it in alcohol, adding an excess of a 1% solution of digitonin in 90% alcohol, decomposing the digitonide with pyridine in the usual manner, and recrystallizing the 7-dehydrocholesterol from acetone and methanol; the purified 7-dehydrocholesterol melts at 142.5–143.5° C., has a rotation of $[\alpha]_D^{25} - 122°$, gives a positive Tortelli-Jaffe and Rosenheim reaction, and exhibits the characteristic ultraviolet spectrum of pure 7-dehydrocholesterol.

(b-1) 200 mg. 7-benzoxy-cholesterol is refluxed for three hours in 10 cc. dimethylaniline under an atmosphere of nitrogen. The cooled reaction mixture is acidified with HCl, and extracted with ether; and the ether extract is washed with successive portions of dilute hydrochloric acid, water, and sodium carbonate. A spectrographic assay of the ether solution shows an approximately 70% content of 7-dehydrocholesterol. The ether is removed by evaporation, and the residue taken up in a small quantity of 90% ethanol, and an excess of a 1% solution of digitonin in 95% ethanol added thereto. The precipitate of 7-dehydrocholesterol digitonide formed weighs 631 mg., and, correcting for the portion removed for spectral analysis, the yield is 79%, calculated as 7-dehydrocholesterol. The digitonide is decomposed with pyridine in the usual manner; and the thus-obtained 7-dehydrocholesterol may be further purified by recrystallization from acetone and methanol.

Example 2

(a) To 3 g. 7-hydroxystigmasterol-dibenzoate in 60 cc. benzene is added a cold solution of 2 g. sodium methylate in 100 cc. absolute methyl alcohol, and the mixture is allowed to stand at room temperature for 24 hours. The reaction mixture is then poured onto cracked ice, and extracted with ether; and the ether extract is washed with water, dried over anhydrous sodium carbonate, and evaporated to dryness. The residue is homogeneous, as shown by dissolving it in benzene, passing the solution through a column of active alumina, and fractionally eluting. The yield of 7-benzoxy-stigmasterol is practically quantitative (2.59 g.).

On crystallization from benzene-hexane, the 7-benzoxy-stigmasterol is obtained in form of fluffy needles melting at 155–7°, resolidifying and remelting at 190–194°, the melting points depending somewhat on the rate of heating. The compound shows the required composition $C_{36}H_{52}O_3$; is specific rotation $[\alpha]_D^{25}$ is $+101°$ (in chloroform); and it is not precipitable by digitonin.

(b) 1 g. 7-benzoxy-stigmasterol is refluxed with 10 cc. dimethylaniline for three hours, and the mixture is worked up as described in Example 1 (b). 1.87 g. digitonide is obtained, corresponding to a yield of 55% (calculated as 7-dehydrostigmasterol). The ether residue resulting from the decomposition of the digitonide is recrystallized repeatedly from acetone-methanol); the 7-dehydrostigmasterol thus obtained melts at 149–152°, and its specific rotation $[\alpha]_D^{24}$ is $-101°$.

The invention may be variously otherwise embodied within the scope of the appended claims.

We claim:

1. The method which comprises treating a 7-hydroxy-sterol di-ester with sodium methylate.

2. The method which comprises treating a 7-hydroxy-sterol di-ester with a hydrolyzing agent under mild reaction conditions.

3. The method of preparing a 7-dehydrosterol, which comprises treating a 7-hydroxy-sterol di-ester with a hydrolyzing agent under mild reaction conditions, and converting the thus-obtained corresponding 7-acyloxy-sterol into the corresponding 7-dehydro-sterol.

4. The method which comprises treating 7-hydroxy-cholesterol di-benzoate with a hydrolyzing agent under mild reaction conditions.

5. The method which comprises treating 7-hydroxy-stigmasterol di-benzoate with a hydrolyzing agent under mild reaction conditions.

OSKAR WINTERSTEINER.
WILLIAM L. RUIGH.

Certificate of Correction

Patent No. 2,411,177. November 19, 1946.

OSKAR WINTERSTEINER ET AL.

It is hereby certified that errors appear in the printed specification of the above numbered patent requiring correction as follows: Column 3, line 45, for "cholesterol" read *cholesteryl* and for "191°" read *192°*; line 69, for "200" read *250*; column 4, line 39, for "is specific" read *its specific*; line 49, for "methanol)" read *methanol*; and that the said Letters Patent should be read with these corrections therein that the same may conform to the record of the case in the Patent Office.

Signed and sealed this 11th day of February, A. D. 1947.

[SEAL]

LESLIE FRAZER,
*First Assistant Commissioner of Patents.*